United States Patent [19]

Larsen

[11] 4,045,317

[45] Aug. 30, 1977

[54] CURABLE POLYENE-POLYTHIOL COMPOUNDS AND METHODS FOR PREPARATION AND CURING

[75] Inventor: Donald W. Larsen, Marriottsville, Md.

[73] Assignee: W. R. Grace & Co., New York, N.Y.

[21] Appl. No.: 695,486

[22] Filed: June 11, 1976

Related U.S. Application Data

[60] Continuation of Ser. No. 558,041, March 13, 1975, Pat. No. 3,976,553, which is a division of Ser. No. 504,410, Sept. 9, 1974, Pat. No. 3,966,794, which is a continuation of Ser. No. 259,148, June 2, 1972, abandoned.

[51] Int. Cl.² ............................ C08F 2/46; C08F 4/00
[52] U.S. Cl. ............................ 204/159.23; 96/115 P; 96/35.1; 204/159.18; 204/159.19; 204/159.22; 204/159.24; 260/77.5 CR; 260/77.5 BB; 260/79.7; 260/455 R; 260/470; 260/455 A; 260/471 C; 427/54; 428/419; 428/425; 428/428; 428/462; 428/483
[58] Field of Search ...................... 204/159.22, 159.23, 204/159.24; 260/77.5 CR, 77.5 BB, 79.7

[56] References Cited

U.S. PATENT DOCUMENTS

| | | | |
|---|---|---|---|
| 3,697,395 | 10/1972 | Kehr et al. | 260/77.5 BB |
| 3,839,354 | 10/1974 | Habermeier et al. | 260/77.5 AQ |
| 3,945,982 | 3/1976 | Morgan | 260/77.5 BB |
| 3,976,553 | 8/1976 | Larsen | 204/159.22 |

*Primary Examiner*—Richard B. Turer
*Attorney, Agent, or Firm*—Richard P. Plunkett; K. E. Prince

[57] ABSTRACT

The invention disclosed is directed to new curable liquid polyene-polythiol compounds containing particular polar groups, at least one unsaturated carbon-to-carbon bond disposed at a terminal position on a main or pendant chain of the molecule and at least one terminally disposed thiol group, with the sum of the unsaturated bonds and thiol groups per polyene-polythiol molecule being at least 3. Upon curing in the presence of a free radical generator such as actinic radiation, the polar polyene-polythiol compounds form solid elastomeric and rigid products which are useful in a variety of applications including coatings, adhesives, sealants and molded articles.

4 Claims, No Drawings

CURABLE POLYENE-POLYTHIOL COMPOUNDS AND METHODS FOR PREPARATION AND CURING

This is a continuation of application Ser. No. 558,041, filed 13 Mar. 1975, and now U.S. Pat. No. 3,976,553; said application Ser. No. 558,041 is a divisional of application Ser. No. 504,410, filed 9 Sept. 1974, and now U.S. Pat. No. 3,966,794; said application Ser. No. 504,410 is a continuation of application Ser. No. 259,148, filed 2 June 1972, and now abandoned. The benefit of each of said prior applications is claimed.

The present invention relates to curable liquid polyene-polythiol compounds, processes for preparing the compounds, and to methods for forming solid polythioether products using the compounds.

It is well known in the art that cure of internally unsaturated polymers such as polybutadiene or polyisoprene may be effected with polythiols, using a free radical generator. However, such polymers have not proved to be entirely satisfactory in that, after curing, the cured polymeric products are insufficiently stable in air and other oxygen and ozone-containing environments. A number of commercial one-package systems, e.g. polyurethanes, are curable upon curing initiation by aqueous moisture in the air. Curing reactions for such systems undesirably vary due to wide variations in the moisture content of the air. Other drawbacks of moisture-curable polyurethanes include poor appearance and limited strength of the cured products. Such defects apparently result from gas-evolving reactions of —NCO from the polyurethane with moisture from the air.

It has now been found that numerous defects of heretofore known curable systems may be effectively overcome by practice of the present invention which provides new curable liquid polyene-polythiol compounds containing particular polar functional groups. Upon exposure to a free radical generator, the present compounds may be rapidly and controllably cured to insoluble, crosslinked elastomeric or rigid products.

Generally stated, the curable liquid polyene-polythiol compounds provided by the present invention may be represented by the following general formula:

(HS)$_p$[G]—(X)$_q$ wherein X is

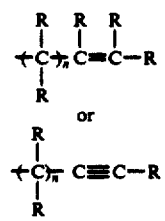

, n being a numeral from 0 to 9; p and q are numerals of at least one, and preferably at least 2, the sum of p plus q being always at least 3 and preferably at least 4; and G is a polyvalent organic moiety having a valence of at least 3, free of reactive carbon-to-carbon unsaturation, free of highly water-sensitive members, and necessarily containing at least one and preferably at least 2 polar groups selected from the group consisting of urethane thiourethane

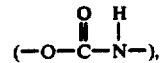

urea

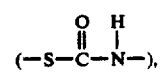

carbonate ester

ester

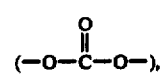

thioester

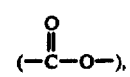

amide

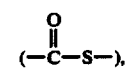

substituted amide

and tertiary amine. The substituent on the substituted amide may be selected from the radical X as defined above and the members of the group from which the radical R is selected as set forth below. Where ester, thioester, amide and substituted amide are included as necessarily contained group they are included in branches of the member G with the members —SH and —X being connected to the branches. Additional polar functionality such as, for example, carboxylic acid (—COOH), ether (—O—), thioether (—S—), nitrile (—C ≡ N), quaternary amine salt, chloride, bromide, etc., may be included.

The member G may include atoms selected from carbon, oxygen, nitrogen, sulfur, hydrogen, silicon, phosphorus, chlorine, bromine, etc. Typically, G consists of atoms selected from carbon, oxygen, nitrogen, sulfur and hydrogen.

In the groups:

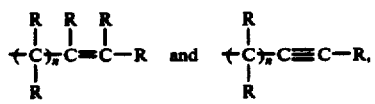

$n$ is an integer from 0 to 9 and R is a radical selected from the group consisting of hydrogen, chlorine, fluorine, furyl, thienyl, pyridyl, phenyl, substituted phenyl, benzyl, substituted benzyl, alkyl, substituted alkyl, alkoxy, substituted alkoxy, cycloalkyl and substituted cycloalkyl. The substituents on the substituted members are selected from the group consisting of nitro, chloro, fluoro, acetoxy, acetamide, phenyl, benzyl, alkyl, alkoxy and cycloalkyl. Alkyl and alkoxy have from 1 to 9 carbon atoms and cycloalkyl has from 3 to 8 carbon atoms.

In general, the present polyene-polythiol compounds may be prepared using relatively mild conditions by reacting certain types of reactive ene intermediates with thiol (—SH) intermediates. Additional reactive intermediates may also be used. The conditions must be controlled so that precuring is avoided and so that concentration of SH groups is not substantially reduced. As a general preference, a first intermediate which contains one or more functional groups selected from isocyanate, anhydride, acid halide, epoxide and the like is reacted with a second intermediate containing one or more functional groups such as OH, SH and NH. Using appropriate reactants these reactions provide products containing polar groups such as urethane, thiourethane, urea, ester, thioester, amide, carboxylic acid, ether, thioether and amine. Additional polar functionality may be present in the intermediates and incorporated into the products.

The ene intermediate can contain any of the desired reactive functional groups other than SH and may be, for example, allyl chloride, allyl isocyanate, 9-decenyl isocyanate, vinyl isocyanate, dodecenyl succinic anhydride, acryloyl chloride, allyl glycidyl ether, allyl alcohol, allyl hydroxyethyl ether, trimethylolpropane monoallyl, ether, trimethylolpropane diallyl ether, pentaerythritol allyl ether, pentaerythritol diallyl ether, pentaerythritol triallyl ether, glycerol allyl ether, glycerol diallyl ether, hydroxy ethyl acrylate, hydroxy propyl acrylate, diallylethanolamine, allylamine and diallylamine. The thiol intermediates may be monothiols or polythiols containing two or more thiol groups per molecule and may contain OH and/or NH groups. Where SH functional groups are to be reacted in preparing the present polyene-polythiols, polythiol intermediates must be used.

Thiol intermediates useful herein include, for example, 2-mercaptoethanol; 2,3-dithiolpropanol; esters of polyols with mercapto acids such as 2- or 3-mercaptopropionic acid and mercaptoacetic acid, including monomercapto and dimercapto esters of diols such as ethylene glycol, mono-, di- and trimercapto esters of trimethylolethane, trimethylolpropane, and glycerol, and mono-, di-, tri- and tetramercapto esters of pentaerythritol; and the like.

Additional intermediates which may be reacted with the ene and thiol intermediates, either separately or in combination are reactive intermediates which have multiple functionality, contain no -SH or reactive ene groups, and can react with two or more of the above reactants to provide the polar groups set forth above. Useful additional intermediates include, for example, polyisocyanates containing two or more -NCO groups such as 3,3'-dimethyl-4,4'-biphenylene-diisocyanate, hexamethylene diisocyanate, 3-isocyanato-3,5,5-trimethylcyclohexylisocyanate, 4,4'-methylenebis(cyclohexylisocyanate), 4,4'-methylenebis(phenyl isocyanate), polymethylene polyphenyl isocyanate, sulfonyl isocyanate, tolylene diisocyanate, and polymeric diisocyanates prepared by capping polymeric diols with diisocyanates; pyromellitic dianhydride and linear polyanhydrides formed by copolymerizing maleic anhydride with vinyl comonomers such as styrene, ethylene, and methyl vinyl ether, polycarboxylic acids and polycarboxylic acid chlorides; phosgene and chloroformates prepared by reacting phosgene with polyols; polyepoxides such as diglycidyl ether of bisphenol A, epoxy novolacs, and 4-vinylcyclohexene dioxide; monomeric and polymeric polyols; polyamines; and the like.

Another useful class of the present curable polyene-polythiol compounds may be made by preparing allyl ethers of polyols, reacting these ethers with thioacids, hydrolyzing the thioesters produced to prepare polythiols or hydroxythiols and combining the hydrolysis products with the intermediate hydroxy allyl ethers and reactive intermediates having multiple functionality (supra). For example, trimethylol propane may be reacted with allyl chloride in the presence of an equivalent amount of base to form the mono-, di- and triallyl ethers. These ethers may then be reacted with thioacetic acid by exposure to a free radical generator such as actinic radiation to form the corresponding thioacetates. Hydrolysis of the thioacetates gives dihydroxymonothiol, monohydroxydithiol and trithiol ethers. The last mentioned ethers may be mixed with the mono- or diallyl ethers and reacted with a suitable reactive intermediate such as a diisocyanate, etc., to prepare curable polyene-polythiols.

The polyene-polythiols of the present invention are essentially uncrosslinked compounds having -SH and reactive unsaturated carbon-to-carbon groups in pendant, terminal, or near-terminal position on the polyene-polythiol molecules. As used herein the term reactive unsaturated carbon-to-carbon groups means ene or yne groups which will react with thiol groups upon exposure to a free radical generator to produce the thioether linkage

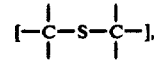

as contrasted to the term unreactive carbon-to-carbon unsaturation which means

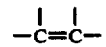

groups found in aromatic nucleii (cyclic structures exemplified by benzene, pyridine, anthracene, and the like) which do not under the same conditions react with thiols to produce thioether linkages.

In defining the position of the thiol and reactive carbon-to-carbon unsaturated groups, the term terminal means that the groups are at an end of the main chain of the molecule, whereas by near-terminal is meant that the groups are not more than 10 carbon atoms, and typically less than 8 carbon atoms, from an end of the main chain of the molecule. The term pendant means that the thiol and carbon-to-carbon unsaturated groups are located terminal or near-terminal in a branch of the main chain in contrast to a position at or near an end of the main chain. For purposes of brevity all these positions are referred to herein generally as terminal, while the reactive unsaturated carbon-to-carbon groups are referred to as enes, ene groups, etc.

In a class of the present polyene-polythiol compounds, the member [G] contains thiourethane derivatives. A general method provided by the present invention for preparing one type of thiourethane-containing polyenepolythiol is to react an ene-isocyanate with a polythiol which is free of reactive unsaturated carbon-to-carbon groups, preferably in the presence of a free radical inhibitor (such as an antioxidant) to essentially prevent premature polythioether-forming reaction of thiol groups with ene groups. The preparation reaction may be represented by general equation I, which follows:

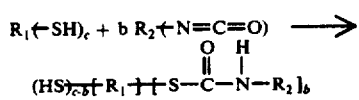

(I)

wherein $R_1$ is a polyvalent organic moiety free of reactive unsaturated carbon-to-carbon groups and free of highly water-sensitive members; $R_2$ is an alkenyl or alkynyl group containing $f$ terminally positioned ene groups where $f$ is a numeral of at least 1; $c$ is a numeral of at least 3; and $b$ is a numeral chosen such that $c$ minus $b$ ($c-b$) is at least 1. The product of $b$ times $f$ ($b \times f$) must be at least 1 and preferably is equal to the difference $c-b$. Thus, if $c$ is 3 and $f$ is 1, $b$ and $b \times f$ must each be from 1 to 2, and $c-b$ is therefore from 1 to 2; preferably $b \times f$ and $c-b$ are each 1.5. If $c$ is 3 and $f$ is 2, $b$ can be from 0.5 to 2 and $b \times f$ can be from 1 to 4; preferably $b$ is 1 and $b \times f$ and $c-b$ are each 2. The reaction is carried out in an inert moisture-free atmosphere (e.g., nitrogen blanket) at atmospheric pressure at a temperature in the range from 0° to about 120° C. for a period of from about 5 minutes to about 25 hours, preferably in the presence of the inhibitor supra.

Another embodiment method for preparing thiourethane-containing polyene-polythiol compounds of the present invention is to react a polythiol, an ene-isocyanate, and a polyisocyanate in the presence of an inhibitor which essentially prevents premature polythioether-forming reaction of thiol groups with ene groups.

In cases where the polythiol is a thrithiol, the ene-isocyanate is a monoene and the polyisocyanate is a diisocyanate, the reaction may be illustrated by equation II which follows:

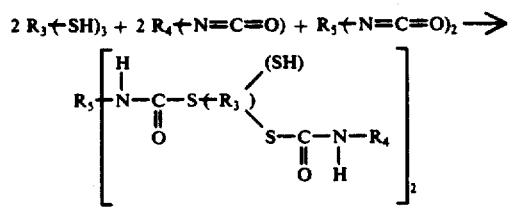

(II)

wherein $R_3$ and $R_5$ are polyvalent organic moieties free of reactive unsaturated carbon-to-carbon groups and free of highly water-sensitive members; and $R_4$ is an alkenyl group wherein the ene group is in terminal position. The reaction is carried out in an inert moisture-free atmosphere (e.g., nitrogen blanket) at atmospheric pressure at a temperature in the range from 0° to about 120° C. for a period of from about 5 minutes to about 25 hours, as well as in the presence of the inhibitor supra.

Another class of polyene-polythiol compounds provided by the present invention contain urethane groups in the backbone of the molecule. A general method of forming one type of polyene-polythiol containing urethane groups is to react the following: an ene-ol of the general formula $R_6(OH)$, a thiol-ol of the general formula $R_7(SH)_x(OH)$, and a polyol of the general formula $R_8(OH)_y$, with a polyisocyanate of the general formula $R_9(NCO)_z$ wherein $R_6$ is an organic moiety containing one or more reactive unsaturated carbon-to-carbon groups; $R_7$, $R_8$ and $R_9$ are polyvalent organic moieties free of highly water-sensitive members and free of reactive carbon-to-carbon unsaturation; x is a numeral of at least one; and y and z are numerals of at least 2. Typically, the total number of hydroxyl groups in the ene-ol, thiol-ol, and the polyol is approximately equal to the total number of isocyanate groups in the polyisocyanate. In cases where $R_6(OH)$ is a monoene-mono-ol, x is 1, y is 6 and z is 2, the overall reaction may be illustrated by equation III which follows:

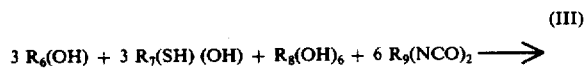

(III)

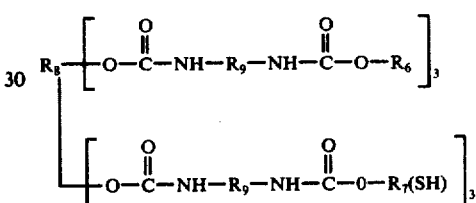

In carrying out the overall reaction illustrated by equation III above, care must be taken to minimize crosslinking the polyol ($R_8(OH)_y$) with the polyisocyanate ($R_9(NCO)_z$) to form an insoluble gel. It is found that formation of insoluble gel may be effectively minimized and typically may be entirely prevented, by carrying out the reaction in a suitable solvent, e.g., benzene, with or without a catalyst. Conveniently, substantially gel-free urethane-containing polyene-polythiols may be prepared by way of adding appropriate amounts of the various reactants to a suitable solvent using almost any order of addition. The ratio of the total weight of reactants to the weight of solvent may have any value which is effective for minimizing gel formation. Addition of about 20 percent by weight reactants to benzene is suitable.

Generally, it is found that attempted syntheses of the present urethane-containing polyene-polythiols, theoretically proceeding according to reactions illustrated by equation III above, wherein the polyisocyanate ($R_9(NCO)_z$) is added to a mixture of the ene-ol ($R_6(OH)$), thiol-ol ($R_7(SH)_xOH$), and polyol ($R_8(OH)_y$) result in undesirable amounts of insoluble gel formation. In general, such attempted syntheses in the presence of catalytically effective amounts of catalyst result in entirely unacceptable formation of such gel.

However, it is not necessary that the reaction media include a solvent in order to minimize insoluble gel formation when preparing the present urethane-containing polyene-polythiols. A variety of methods not requiring solvent may be used. For simplicity, these methods are referred to herein as solventless methods.

However, it is to be understood that such methods may be carried out using a suitable solvent. These solventless methods are especially useful for preparing urethanepolyene-polythiols where the polyisocyanate is an aromatic polyisocyanate having 2—NCO groups attached to one benzene ring, e.g., tolylene diisocyanate. One such solventless method is illustrated by the description which follows. The illustration is given for the case of tolyene diisocyanate, the two —NCO groups of which react at different rates, which difference is especially apparent in the absence of catalyst. However, the method illustrated is applicable to almost any polyisocyanate for which one of its —NCO groups reacts preferentially relative to its other —NCO groups. This method includes reacting the ene-ol ($R_6$(OH)) with tolylene diisocyanate in a first zone in the absence of catalyst using a mole ratio of about 1:1 to form predominantly an ene-isocyanate monoadduct having the general formula

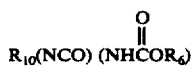

where $R_{10}$ is tolylene ($CH_3\ C_6H_3$ =). The thiol-ol ($R_7(SH)_x\ OH$) is reacted with tolylene diisocyanate in a second catalyst-free zone using a mole ratio of about 1:1 to form predominantly a thiol-isocyanate monoadduct having the general formula

The eneisocyanate adduct is stable in the absence of moisture, etc., and can be stored indefinitely prior to being reacted with the polyol ($R_8(OH)_y$). The thiolisocyanate adduct has limited storage stability in that it reacts to form high molecular weight polythiourea. However, the latter reaction is slower than the reaction of the thiolisocyanate adduct with the polyol ($R_8(OH)_y$). It is found that the desired urethane-containing polythiol-polyene is formed by reacting appropriate amounts of the ene-isocyanate adduct, the thiol-isocyanate adduct and the polyol soon after the thiol-isocyanate adduct is formed.

Another solventless method includes reacting the polyol ($R_8(OH)_y$) with y moles of tolylene diisocyanate ($R_{10}(NCO)_2$) per mole of the polyol in the absence of catalyst to form a polyisocyanate having the general formula

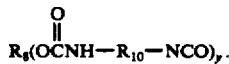

This polyisocyanate is then reacted with the desired amounts of ene-ol ($R_6(OH)$) and thiol-ol ($R_7(SH)_x(OH)$) to form the desired polyenepolythiol. Catalyst can be added to accelerate the second stage of the reaction of tolylene diisocyanate in either of the above cases. Some care must be exercised since the reaction of isocyanate with thiol will be accelerated as well and too much thiol may be used up.

The various reactions used in forming the present urethane-containing polyene-polythiols are carried out in an inert moisture-free atmosphere (e.g., nitrogen blanket) at atmospheric pressure at a temperature in the range from 0° to about 120° C. for a period of from about 5 minutes to about 25 hours, as well as in the presence of the inhibitor supra.

Polyene-polythiols containing urea groups may be prepared in substantially the same manner as given in the preceding description of preparation of urethane containing polyene-polythiol compounds by substituting polyamine for polyol and polyene-amine for polyene-ol.

The polyene-polythiols can contain any desirable combination of urethane, thiourethane and urea groups.

In forming the thiourethane and urethane containing polyene-polythiols of the present invention, catalytic amounts of a catalyst may be employed to increase the rate of reaction. Catalysts are especially useful in forming the urethane-containing compounds where an ene-ol is employed as a reactive intermediate. Suitable catalysts are well known in the art and include organometallic compounds such as stannous octoate, stannous oleate, dibutyl tin dilaurate, cobalt acetylacetonate, ferric acetylacetonate, lead naphthanate and dibutyl tin diacetate and tertiary amines such as triethylene diamine. Catalysts are not required for reactions of isocyanate with amines.

Another class of the present polyene-polythiol compounds contains ester, thioester or amide groups in the backbone of the molecule. A general method of forming these products is to react a polyanhydride of the general formula

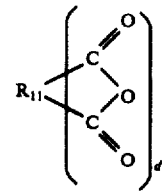

with a polyene-ol of general formula $R_{12}(OH)$ and a polythiol of general formula $R_{13}(SH)_3$, where $R_{11}$ and $R_{13}$ are polyvalent organic moieties free of reactive unsaturated carbon-to-carbon groups and free of highly water-sensitive members, $R_{12}$ is an organic moiety containing at least one and preferably at least 2 terminal reactive unsaturated carbon-to-carbon groups, d is a numeral of at least 2, and e is a numeral of at least one and preferably at least 2. Suitable polyanhydrides include pyromellitic dianhydride and linear polyanhydrides formed by copolymerizing maleic anhydride with vinyl comonomers, e.g., styrene, ethylene, and methyl vinyl ether. The reaction is illustrated for a dianhydride, diene-ol and trithiol in equation IV below:

(IV)

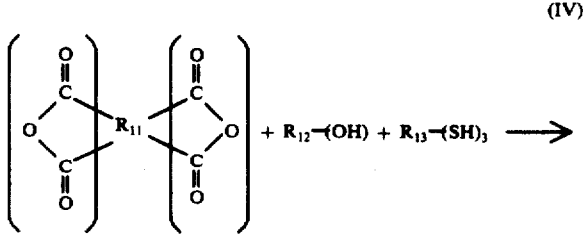

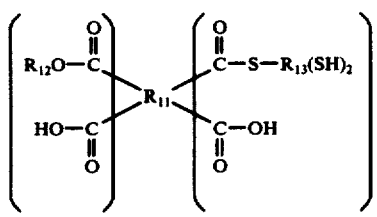

Substitution of an aminodiene for the dieneol gives a polyene-polythiol, a product containing amide groups. This product may be illustrated by the following general formula wherein $R_{11}$, $R_{12}$, and $R_{13}$ are as defined above:

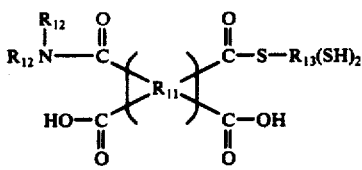

The two $R_{12}$ groups may be the same or different.

The reaction is carried out in an inert moisturefree atmosphere (e.g., nitrogen blanket) at atmospheric pressure at a temperature in the range from 0° to about 120° C. for a period of from about 5 minutes to about 25 hours, and in the presence of the inhibitor supra.

Another general method of forming ester, thioester and amide containing polyene-polythiols is to react polyacyl halides with hydroxy, thiol and amino substituted reactants. A base may be required to take up the hydrogen halide produced as a side product.

The present polyene-polythiol compounds may be cured to solid resins or elastomers either alone or in combination with compatible materials. For example, liquid photocurable compositions characterized with rapid curing rates may be prepared by blending the present polyene-polythiols with almost any chemical photocuring rate accelerator.

Specifically useful herein are chemical photocuring rate accelerators such as benzophenone, acetophenone, azobenzone, acenapthene-quinone, o-methoxy benzophenone, Thioxanthen-9-one, xanthen-9-one, 7-H-Benz[de] anthracen-7-one, dibenzosuberone, 1-naphththaldehyde, 4,4'-bis (dimethylamino) benzophenone, fluorene-9-one, 1'-acetonaphthone, 2'-acetonaphthone, anthraquinone, 1-indanone, 2-tert.-butyl anthraquinone, valerophenone, hexanophenone, 8-phenyl-butyrophenone, p-morpholinopropiophenone, 4-morpholino-benzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 1,3,5-triacetylbenzene and the like including blends thereof, to greatly reduce the exposure times.

The curing rate accelerators are usually added in an amount ranging from about 0.0005 to about 50 parts by weight, and preferably from about 0.05 to about 25 parts by weight, per 100 parts by weight of the polyenepolythiols. Preferred photocuring rate accelerators are the aldehyde and ketone carbonyl compounds having at least one aromatic nucleus attached directly to the 

group.

The present curable compounds and curable compositions formulated therewith are characterized by insensitivity to visible light, rendering them generally free from setting on, for example, apparatus which may be used to apply the composition to a substrate. Upon exposure to actinic light, the present curable compositions are found to be rapidly curable, making them eminently suitable for use in high speed coating operations.

A class of actinic light useful herein for curing is ultraviolet light and other forms of actinic radiation which are normally found in radiation emitted from the sun or from artificial sources such as type RS sunlamps, carbon arc lamps, xenon arc lamps mercury vapor lamps, tungsten halide lamps and the like. Ultraviolet radiation may be used most efficiently if the curable polyene/polythiol compound contains a suitable photocuring rate accelerator.

Curing periods may be adjusted to be very short and hence commercially economical by proper choice of ultraviolet source, photocuring rate accelerator and concentration thereof, temperature and molecular weight, and number of ene and thiol groups per molecule of the polyenepolythiol. Curing periods of less than about 1 second duration are possible in some applications.

Conventional curing inhibitors or retarders which may be used in order to stabilize the components of the curable compositions so as to prevent premature onset of curing may include hydroquinone; p-tert.-butyl catechol; 2,6-ditert.-butyl-p-methylphenol; phenothiazine; N-phenyl-2-naphthylamine; inert gas atmospheres such as helium, argon, nitrogen and carbon dioxide; vacuum; and the like.

Blends and mixtures of the polyene-polythiols are also operable herein for forming crosslinked polythioether end products.

The compositions to be cured, i.e., (converted to solid resins or elastomers) in accord with the present invention may, if desired, include such additives as antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers and the like within the scope of this invention. Such additives may be blended with the polyene-polythiol using conventional blenging techniques.

Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polyene-polythiol by weight and preferably about 0.0005 to about 300 parts on the same basis.

Liquid curable compositions comprising the present polyene-polythiol compounds are readily cured to the solid state by exposing to a free radical generator such as actinic radiation (preferably UV light); high energy radiation such as electron beams; and chemical initiators such as organic peroxides, diazo compounds and the like. Useful end products which may be formed are numerous and varied and include, for example, adhesives, coatings, sealants and molded articles such as gaskets, tires, etc.

The present invention will be further illustrated by the following non-limiting examples. Throughout this disclosure all parts and percentages given are by weight unless otherwise indicated.

EXAMPLE 1

448 grams (1 mole) of pentaerythritol tetrakis (2-mercaptopropionate), 166 grams (2 moles) of allyl isocyanate, 0.65 grams of dibutyl tin dilaurate, and 0.65 grams of Ionol (trademark for a phenol product having antioxidant properties by the Shell Chemical Corp.) were heated with stirring under nitrogen in a vessel at 70° C. for about 30 minutes to one hour. The produce was cooled and discharged from the vessel. Analysis of the product showed it to be a diene-dithioldithiourethane having a thiol-ene functionality of 4, a molecular weight of 614, and the following average formula:

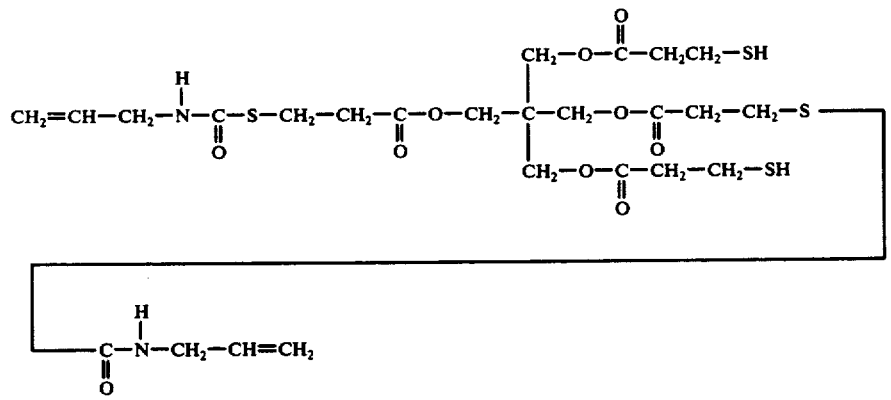

6.5 grams of benzophenone and 0.65 gram of hydroquinone were added to the product at room temperature and mixed in a vessel. The resulting liquid mixture was poured at room temperature onto a substrate coated with a silicone release agent. The layer was leveled to a substantially uniform thickness of about 60 mils and thereafter exposed to a type RS sunlamp at an intensity of about 4000 microwatts per square centimeter on the exposed surface. Observations showed that the film was cured on its exposed surface to a thin film after about 10 seconds and was cured clear through in about 40 seconds. The cured slab was peeled from the substrate and subjected to physical property tests which showed a tensile modulus of about 1160 pounds per square inch, a tensile strength of about 390 pounds per square inch, and 50% elongation at failure.

EXAMPLE 2

800 grams (2 moles) of trimethylol propane tris (beta-mercaptoproprionate), 174 grams (1 mole) tolylene diisocyanate, 166 grams (2 moles) allyl isocyanate, 0.5 gram dibutyl tin dilaurate and 0.5 gram Ionol were mixed in a vessel and heated to 70° C. for one hour while passing nitrogen through the vapor space of the vessel. After adding 5 grams benzophenone and 0.5 gram hydroquinone to the liquid reaction mass, the product was cooled and discharged from the vessel. Analysis of the product showed that it consisted principally of an 1140 molecular weight tetrathiourethane-diene-dithiol having the following formula:

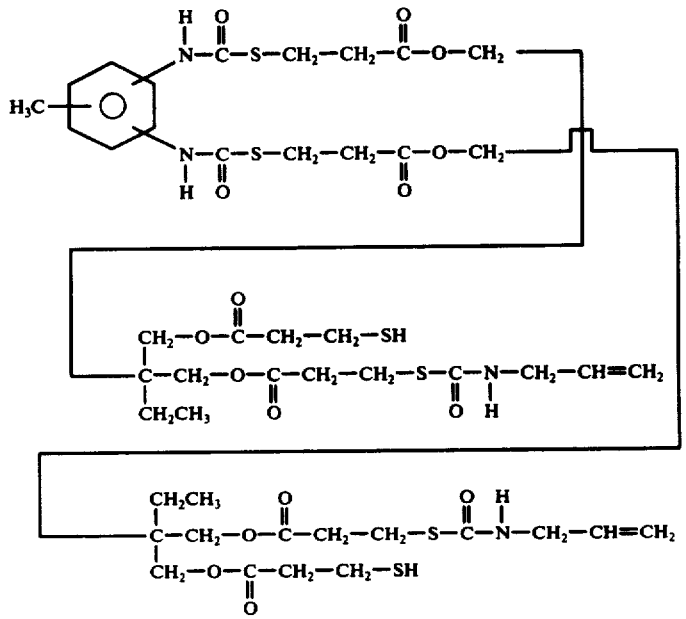

The thus prepared composition was poured onto a flat Mylar support and leveled to a uniform 10-mil thickness using a doctor blade. Thereafter the layered composition was exposed to a type RS sunlamp of 250 watts power positioned about 6 inches above the composition for about 15 minutes, during which time the liquid composition cured or set to a tough, flexible solidified resin. Tests showed that the resin article had a Shore D hardness of 16.

EXAMPLE 3

To 9000 grams of benzene in a reaction flask was added 700 grams (1 mole) of a commercially available hexol adduct of Inositol and propylene oxide, sold under the tradename NIAX Polyol LS-490 by Union Carbide Corp., 232 grams (4 moles) of allyl alcohol, 248 grams (2 moles) of 2,3-dimercaptopropanol, 0.5 gram dibutyl tin dilaurate and gradually, with good stirring, 1044 grams (6 moles) tolylene diisocyanate. The mixture was maintained at 65° C. by the heat of the reaction and maintained thereat for about 1 hour after the addition of the diisocyanate. Benzene was stripped from the 20 weight percent solution of the reaction product using an applied vacuum of about 2 mm. of mercury while heating the reacton mixture to about 100° C. The hexol added had the following formula:

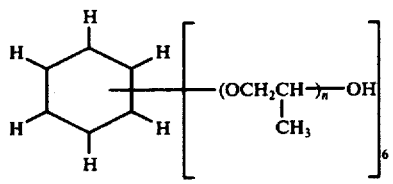

wherein n is a numeral from 1 to 2, with n being, on the average, about 1.5 per molecule. The stripped resin product consisted principally of a tetrathiol-tetraenedodecaurethane having the following formula:

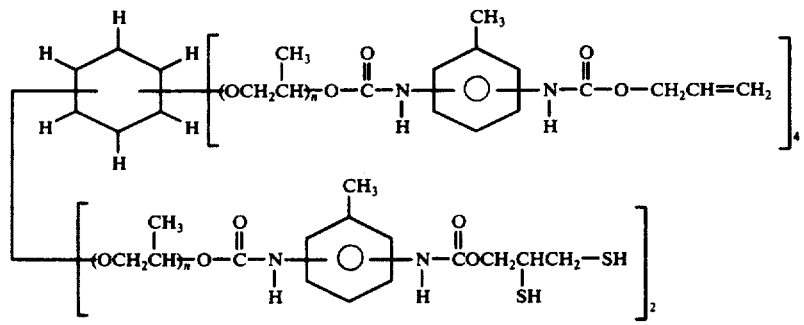

wherein n is as defined above. The product having an average molecular weight of 2224 was a solid at room temperature but a liquid at 70° C.

A liquid photocurable composition was prepared by heating 112 grams of the product to 70° C. and mixing it with 1.8 grams of benzophenone and 0.2 gram of 2,6-di-t-butylmethylphenol. The liquid curable composition was poured onto a Mylar (terephthalate ester product by DuPont) film of about 3 mils thickness and leveled to a liquid depth of about 25 mils using a doctor blade. Thereafer the applied composition was exposed through a photographic negative adhered to a glass plate positioned about 5 mils above the curable layer to a xenon arc lamp at a liquid surface intensity of about 4000 microwatts per square centimeter for about 10–15 minutes, during which time the liquid composition was found to cure substantially through its thickness in the exposed areas. The curable composition in the unexposed areas remained a liquid of essentially the same viscosity as that of the composition prior to exposure and was removed by immersion for about 3 minutes in an agitated aqueous bath containing 10% of a detergent commercially available under the trade mark "LIQUINOX" from Alconox Inc. Next, the printing plate being formed was removed from the bath and dried in air at about 80° C. Printing ink was applied to the relief image areas using an inking roller in conventional manner, and the inked plate was pressed against newsprint paper for a short period of time resulting in transferring ink in the image areas to the paper. Excellent image definition and fidelity were observed on the printed paper

EXAMPLE 4

700 grams (1 mole) of NIAX-Polyol LS-490 (the hexol of Example 3), 232 grams (4 moles) of allyl alcohol, 248 grams (2 moles) of 2,3-dimercaptopropanol, and 0.65 grams of dibutyl tin dilaurate were heated to 70° C. in a nitrogen-blanketed glass reaction flask. 1044 grams (6 moles) of tolylene diisocyanate was slowly added to the heated bulk reaction mixture with stirring. Prior to completing the tolylene diisocyanate addition, a solid crosslinked insoluble mass resulted in the vessel. The mass was useless as a curable composition for controllably forming solid polythioether sealants, coatings, molded articles, etc.

EXAMPLE 5

696 grams (4 moles) of tolylene diisocyanate was added to 232 grams (4 moles) of allyl alcohol in a stirred reaction flask under a nitrogen blanket. These reactants were heated to 70° C. and maintained thereat with stirring for about 3 hours. The principal component of the reaction product was a urethane-containing monoadduct having the formula:

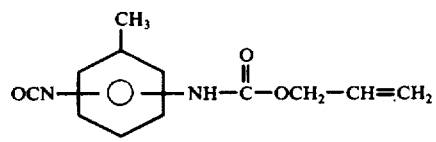

The product of this reacton will hereinafter be referred to as Product A. 348 grams (2 moles) of tolylene diisocyanate was charged to a second stirred reaction flask contaning 248 grams (2 moles) of 2,3-dimercaptopropanol. These reactants were heated to 80° C. and maintained thereat with stirring for about 3 hours. The thus formed product included as its principal component the dithiol urethane-containing monoadduct having the formula:

discharged from the vessel. The principal component of the product was a 912 molecular weight diurethane-dithiourethane-dienedithiol having the the following formula:

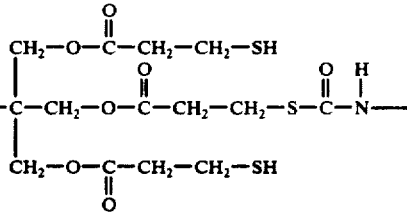

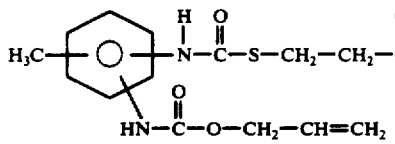

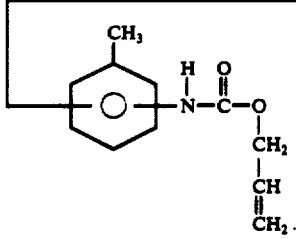

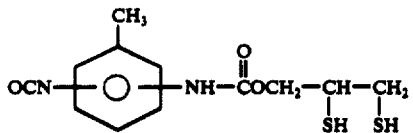

This product will be referred to hereinafter as Product B.

0.5 gram of Ionol (a commercially available phenol anti-oxidant), half of Product A, and half of Product B were mixed in a stirred vessel and the mixture was added to a reaction flask containing a mixture of 0.25 gram of dibutyl tin dilaurate with 350 grams (0.5 mole) of Niax Polyol LS-490 (the hexol of Example 3). This reaction flask was heated to 70° C. under a nitrogen blanket and the reaction was continued with stirring at 70° C. for 1 hour. The principal component of the resulting product was found to be a tetrathiol-tetraene dodecaurethane having the formula given in Example 3 for the tetrathioltetraene product thereof.

The remaining half of Product A was added to a stirred reaction flask containing 0.25 gram of stannous octoate, 0.5 gram of Ionol, and 350 grams (0.5 mole) of Niax Polyol Ls-490. The thus formed reaction mixture was heated to 70° C. and the reaction was continued thereat for 1 hour. Next, the remaining half of Product B was charged to the reaction mixture and the temperature was maintained at 70° C. with stirring for 1 hour. The reaction product using this sequence was substantially the same as that obtained using the above procedure wherein Product A and Product B were simultaneously added to the hexol.

EXAMPLE 6

348 grams (2 mols) of tolylene diioscyanate and 116 grams (2 moles) of allyl alcohol were heated with stirring in a vessel under a nitrogen blanket at a temperature of about 65° C. for about 1 hour. Thereafter, 0.5 gram of Ionol, 448 grams (1 mole) of pentaerythritol tetrakis (2-mercaptopropionate) and 0.5 gram of stannous octoate were added and the reaction was continued for about 1 hour at 100° C. 0.5 gram of hydroquinone and 5 grams of acetophenone were added with stirring to the mixture, which thereafter was cooled and A printing plate was formed from this photocurable composition using the procedure of Example 3. The results were substantially the same.

EXAMPLE 7

214 grams (1 mole) of trimethylol propane diallyl ether and 167 grams (2.2 mols) of thioacetic acid were added to a Pyrex tube, 10 inches in length and 2 inches in diameter. A low pressure mercury lamp enclosed in a 1-inch diameter quartz tube was then immersed in the mixture, and irradiation was carried out using the lamp for 20 hours with stirring. Excess thioacetic acid was removed from the resulting yellow viscous liquid in a rotary evaporator. The residue was heated to 140° C. at 0.5 mm. of Hg to remove any volatile material that might be present. After cooling, the yellow liquid was decolorized using conventional charcoal absorption techniques. The liquid addition product was placed in a 1-liter, three-neck, round bottom flask equipped with mechanical stirrer and reflux condenser. An aqueous solution of 60 g. sodium hydroxide in 180 ml. $H_2O$ was added, and the resulting mixture was heated with stirring for 5 hours. After cooling to room temperature, the reaction mixture was extracted with 500 ml. of diethyl ether and the ether layer separated. Ether was removed by distillation and the liquid residue was heated to 125° C. at 0.5 mm. of Hg for 1 hour to remove any volatile materials that might be present. The resulting colorless liquid residue was found to consist essentially of trimethylolpropane di(3-mercaptopropyl) ether and was cooled to 25° C. for subsequent use.

To a 3-liter reaction flask containing 1 gram Irganox 1076 (an oxidation stabilizer commercially available from Geigy Chemical Co. and believed to be a dodecyl ester of 4-hydroxy-3,5-di-t-butyl phenyl propionic acid), in 214 grams (1 mole) trimethylol propane diallyl ether under a nitrogen blanket was added, with stirring, 174 grams (1 mole) tolylene diisocyanate. Next, the reaction mixture was heated to 70° C. and maintained thereat with continued stirring for 30 minutes. The principal component of the resulting product was found to be a diene having the following formula:

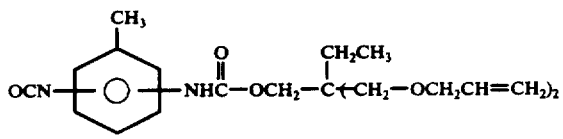

After cooling this diene-containing mixture to about 25° C., 278 grams (1 mole) of the previously formed trimethylol propane dimercaptopropyl ether was added, which addition was followed by adding 0.33 gram dibutyltin dilaurate. The reaction mixture was warmed gradually to 70° C. with stirring, and the reaction was continued until the —NCO content was reduced to essentially zero. The thus formed liquid reaction product was found to consist essentially of a diurethane-dithiol-diene having the following formula:

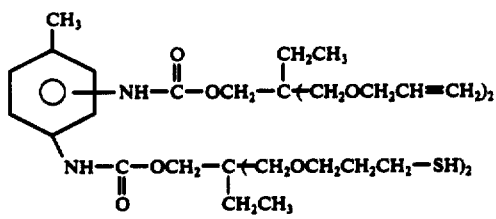

5 grams benzophenone (UV sensitizer) was stirred into the preceding liquid dithiol-diene product. The resulting sensitized mixture was poured onto aluminum sheet, spread into a 20-mil layer, and thereafter exposed to a type RS sunlamp for 2-3 minutes, during which time the liquid composition cured to a solid, odorless, elastomeric coating.

EXAMPLE 8

98 grams (1 mole) of diallylamine was added to a stirred 3-liter flask containing a solution of 1 gram of Irganox 1076 and 612 grams of styrene/maleic anhydride copolymer in 1110 grams of benzene under nitrogen. The copolymer had molecular weight of about 1700 and included 2 polymerized styrene units per polymerized anhydride unit. After refluxing the reaction mixture for 1 hour at 80°-82° C., 399 grams of trimethylolpropane tris(β-mercaptopropionate) was added quickly and reaction was continued with refluxing at 80°-82° C. for 1 hour. The principal component of the product consisted essentially of repeated units having the formula:

10 grams of benzophenone per 100 grams of polymer was added with stirring to the benzene solution of this polymeric diene-dithiol product, and thereafter a piece of paper was dipped into the solution. After withdrawing the solution coated paper, benzene was removed under vacuum at 70° C. The remaining paper-disposed polymer composition was exposed to a type RS sunlamp until a firm, tough polythioether-paper composite was formed.

EXAMPLE 9

A reaction mixture was formed by adding to a steam-jacketed stainless steel reaction kettle, 103 grams (1 mole) of diethylenetriamine, 285 grams (2.5 moles) of allyl glycidyl ether, 150 grams (2.5 moles) of ethylene sulfide and 0.5 gram Ionol (to prevent premature -SH addition to the carbon-to-carbon double bond). A nitrogen blanket was provided on the kettle and a steel cover was secured thereon so as to seal the kettle. Steam was introduced into the jacket resulting in increasing the temperature of the reaction mixture to 95° C. to 100° C. and increasing the kettle pressure to about 35 pounds per square inch gauge (psig). Reaction was continued with heating and stirring until the reaction pressure was decreased to less than 5 psig. Thereafter the reactor was vented to atmospheric pressure and excess volatile material was carried off using nitrogen as the carrier. The thus formed liquid polyene-polythiol product included an average of 2.5 equivalents per mole of product of (NCH₂CH₂SH) and 2.5 equivalents per mole of product of

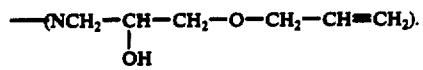

After dissolving 1 gram benzophenone (UV sensitizer) in the product, the sensitized liquid composition was spread into a thin film, and cured under a sunlamp to a solid elastomeric polythioether polymer.

The present polyene-polythiol compounds, upon exposure to a free-radical generator, e.g., actinic radiation and preferably ultraviolet light, form cured polythioether products having many and varied uses. Examples of some uses include but are not limited to adhesives; caulks; elastomeric sealants; coatings; encapsulating or potting compounds; liquid castable elastomers; thermoset resins; impregnants for fabric, cloth, fibrous webs and other porous substrates; laminating adhesives and coatings; mastics; glazing compounds; fiberglass rein-

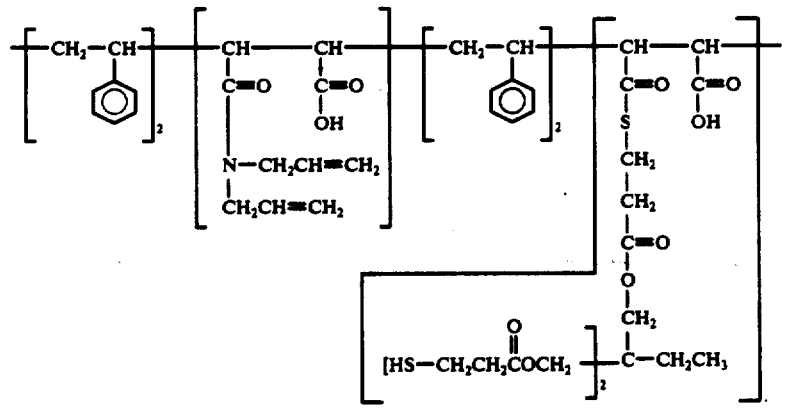

forced composites; sizing or surface finishing agents, filleting compounds; cure in place gasketing compounds; rocket fuel binders; foamable thermosetting resins or elastomers; molded articles such as gaskets, diaphragms, balloons, automobile tires, photoresists, photocurable printing plates, etc. The increased polarity of the present polyene-polythiols aids in forming cured polythioethers having greatly improved performance characteristics such as higher tensile strength, greater elongation, improved adhesiveness to substrates, and the like.

As used herein highly water-sensitive groups are intended to include, for example, isocyanate, acylhalide such as acylchloride, anhydride and the like which readily react with water, alcohols, amines, ammonia and the like.

It is to be understood that the foregoing detailed description is given merely by way of illustration and that numerous modifications may be made therein without departing from the spirit or scope of the present invention.

What is claimed is:

1. A method for forming a solid article comprising exposing a compound having the formula

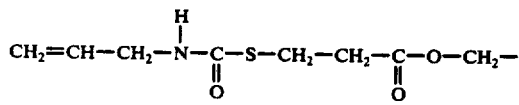

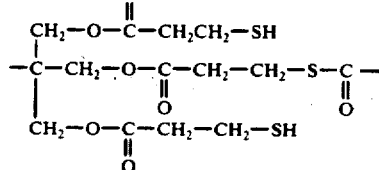

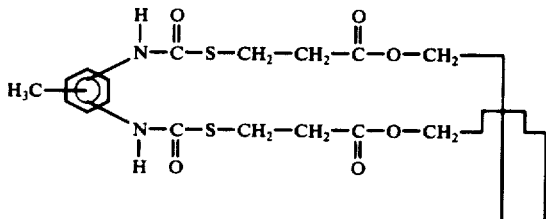

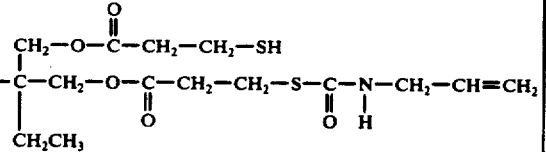

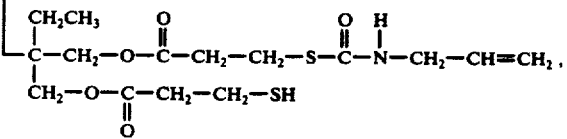

2. The method of claim 1 wherein the free radical generator is actinic radiation.

3. The method of claim 2 wherein 0.0005-50 parts by weight of the compound of a photocuring rate accelerator is added to the compound.

4. The method of claim 1 wherein the free radical generator is high energy radiation.

* * * * *